(Model.)

A. BOYNTON & H. W. PEACE.
SAW.

No. 274,708. Patented Mar. 27, 1883.

Attest:
F. W. Howard
John C. Schroeder

Inventors:
Alfred Boynton
Harvey W. Peace
by Dyer & Wilber
attys.

UNITED STATES PATENT OFFICE.

ALFRED BOYNTON AND HARVEY W. PEACE, OF BROOKLYN, NEW YORK.

SAW.

SPECIFICATION forming part of Letters Patent No. 274,708, dated March 27, 1883.

Application filed June 1, 1880. (Model.)

*To all whom it may concern:*

Be it known that we, ALFRED BOYNTON and HARVEY W. PEACE, of Brooklyn, in the county of Kings and State of New York, have invented a new and useful Improvement in Saws; and we do hereby declare that the following is a full and exact description of the same, reference being had to the accompanying drawings, and to the letters of reference marked thereon.

Our improvement relates to a better construction and arrangement of the teeth of saws having cutting and clearing teeth for the purpose of making them more effective in use; and it consists principally in grooving the outer edges of the clearing-teeth, and in combining such grooved clearing-teeth with cutting-teeth, all as more fully hereinafter explained.

For the better comprehension of our improvement, reference may be made to accompanying drawings, in which—

Figure 1:
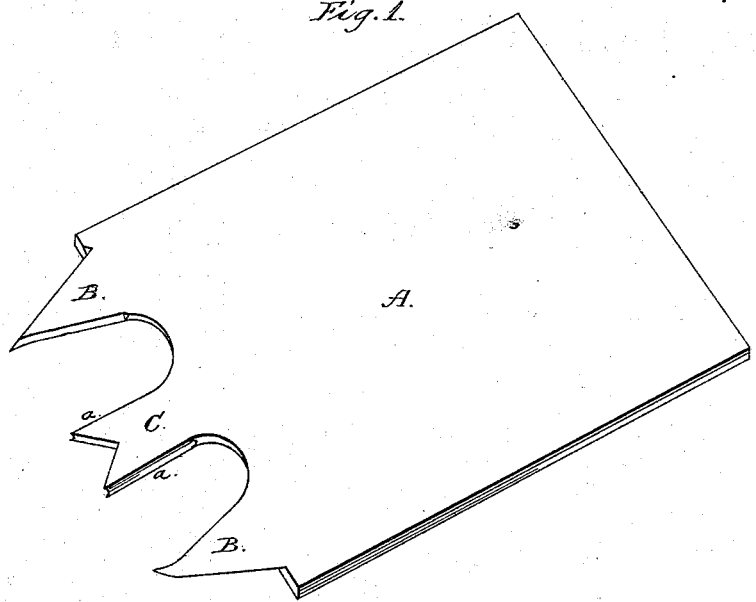
Figure 2:
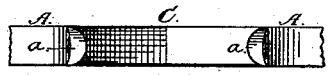
Figure 3:
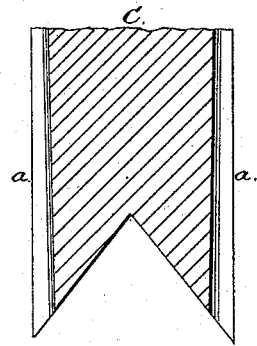

Figure 1 is a view a little in perspective of a portion of a saw with a clearing-tooth between cutting-teeth; Figs. 2 and 3, separate views, showing the clearing-tooth in detail.

The same letters designate similar parts in each figure.

In the drawings, A denotes a portion of a saw-plate; B, the cutting-teeth, and C the clearing-tooth upon the same. The teeth B and the tooth C may be of any old and well-known form in exterior outline, and the teeth B are beveled and swaged in opposite directions. The tooth C has, however, its exterior sides grooved, as shown by the letter *a*. This groove is preferably semicircular in cross-section, but may be angular. Preferably it extends from the root of the tooth to its extreme end, gradually increasing in depth; but it may extend only a portion of the distance named, and may be of regular depth throughout, or even of less depth at the point than toward the root. It is, however, essential that the groove at and near the point should cover nearly the entire thickness of the tooth, and should present at and near the point edges quite thin and sharp. This clearing-tooth thus constructed is placed preferably between every two of the cutting-teeth which are employed in the saw. It is quite obvious that this improvement may be applied to inserted teeth as well as to solid teeth.

In the operation of sawing with our improvement the cutting-teeth cut or score out the wood on each side of the kerf to the depth of their extreme points in the passage of the teeth through it, and each succeeding clearing-tooth scrapes and planes out the kerf by its sharp points down to such extreme depth of the cut, and by its sharp sides cuts off the rough fibrous portions left in the path of the cutting-teeth, so that the resistance to the succeeding cutting-teeth is lessened.

The effect of the construction and combination of our teeth is a decrease of resistance, consequently a more easy movement of the saw, and therefore an ability to accomplish more work.

The grooving mentioned may be made with proper milling-tools at a small expense.

Having thus described our invention, what we believe to be new therein, which we wish to protect by Letters Patent, is—

A saw-blade provided with clearing and cutting teeth placed alternately, said clearing-teeth being provided, as described and shown, with suitable grooves.

This specification signed and witnessed this 20th day of May, 1880.

ALFRED BOYNTON.
HARVEY W. PEACE.

Witnesses:
FRANCIS E. ROGERS,
JOSEPH CARNEY.